United States Patent
Meyberg Guzman et al.

(10) Patent No.: US 10,455,067 B1
(45) Date of Patent: Oct. 22, 2019

(54) HOLDER FOR A MOBILE COMPUTING DEVICE

(71) Applicant: Plantronics, Inc., Santa Cruz, CA (US)

(72) Inventors: Jacob T Meyberg Guzman, Santa Cruz, CA (US); Joseph W Yang, San Jose, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 16/130,813

(22) Filed: Sep. 13, 2018

(51) Int. Cl.
*H04M 1/06* (2006.01)
*G06F 1/16* (2006.01)
*H02J 50/10* (2016.01)
*A45F 5/10* (2006.01)

(52) U.S. Cl.
CPC ............... *H04M 1/06* (2013.01); *A45F 5/102* (2013.01); *G06F 1/1632* (2013.01); *G06F 1/1656* (2013.01); *H02J 50/10* (2016.02); *A45F 2200/0516* (2013.01)

(58) Field of Classification Search
CPC ............ H04M 1/05; H04M 1/06; H04M 1/04; H04M 1/6041; F16M 13/00; F16M 11/38; F16M 11/0015; F16M 11/041; F16M 13/02; A47B 23/04; A47B 23/042
USPC ................... 379/447, 446, 449, 426, 428.01; 248/346.03, 309.01, 264.1; 455/575.3; 361/679.23, 679.01
See application file for complete search history.

(56) References Cited

U.S. PATENT DOCUMENTS

| | | | |
|---|---|---|---|
| 9,820,567 B1 * | 11/2017 | Zaloom | F16M 11/12 |
| 2012/0199501 A1 | 8/2012 | Le Gette et al. | |
| 2013/0119225 A1 * | 5/2013 | Lau | G06F 1/1632 |
| | | | 248/634 |
| 2014/0347814 A1 * | 11/2014 | Zaloom | G06F 1/1626 |
| | | | 361/679.56 |
| 2015/0163936 A1 * | 6/2015 | Le Gette | F16M 11/04 |
| | | | 206/45.2 |

OTHER PUBLICATIONS

Unknown, "QI Quick Wireless Charger Pad Foldable Phone Stand Dock for Samsung S9 IPhone X," found at URL <https://www.ebay.com/itm/QI-Quick-Wireless-Charger-Pad-Foldable-Phone-Stand-Dock-for-Samsung-S9-IPhone-X-/183126215169?oid=121969189670>, last updated on May 25, 2018, 7 pages.

* cited by examiner

*Primary Examiner* — Melur Ramakrishnaiah
(74) *Attorney, Agent, or Firm* — Thomas S. Dienwiebel; Slayden Grubert Beard PLLC

(57) ABSTRACT

A holder for a mobile computing device is provided, which comprises a base member with a plurality of spaced angular adjustment recesses; a device platform, the device platform being pivotably connected to the base member and being configured for receiving a mobile computing device; and a support member, pivotably connected with the device platform and configured for engagement with one of the angular adjustment recesses to allow a plurality of different angular positions of the device platform with respect to the base member. Herein, the support member is spring-loaded to, upon movement of the device platform by a user, move from a first of the adjustment recesses to an adjacent adjustment recess.

20 Claims, 9 Drawing Sheets

HOLDER FOR A MOBILE COMPUTING DEVICE

FIELD

The present disclosure relates generally to the field of mobile computing devices and in particular to a holder for a mobile computing device.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Mobile computing devices, such as smart phones, tablets, laptops, are ubiquitous in today's life. More and more, these devices supersede traditional communication devices, such as desk phones and other PSTN phones. In addition to traditional voice communication, modern computing/communication devices also allow high-quality video communication. This technology is enabled by the processing power of these devices and in addition, by the wide availability of high-speed computer networks.

A problem for video calls however is that most of the mobile computing devices available today are meant for hand-held operation. During longer video calls, holding the device up in a position for obtaining video, e.g. from the user's face, may result in a relatively untypical hand position, which may be quite uncomfortable or cause pain.

SUMMARY

The inventors of this application have ascertained that while stands or holders for mobile computing devices are available, these have various drawbacks. One main issue of available stands is a lack of adjustability, which is important in particular for video calls. Another issue of available stands relates to stability, in particular when operating the mobile computing device.

Accordingly, an object exists to provide an adjustable holder for a mobile computing device that provides sufficient stability to operate the mobile computing device while in the holder and also allow an easy and comfortable adjustment.

The object is solved by a holder for a mobile computing device according to claim 1.

The dependent claims and the following description discuss various embodiments.

In one aspect of the invention, a holder for a mobile computing device is provided, comprising a base member with a plurality of spaced angular adjustment recesses, a device platform, the device platform being pivotably connected to the base member and being configured for receiving a mobile computing device. The holder further comprises a support member, pivotably connected with the device platform and configured for engagement with one of the angular adjustment recesses to allow a plurality of different angular positions of the device platform with respect to the base member. The support member is spring-loaded to, upon movement of the device platform by a user, move from a first of the adjustment recesses to an adjacent adjustment recess.

The details of one or more embodiments are set forth in the accompanying drawings and the description below. Other features will be apparent from the description, drawings, and from the claims.

DETAILED DESCRIPTION

Figure 1:
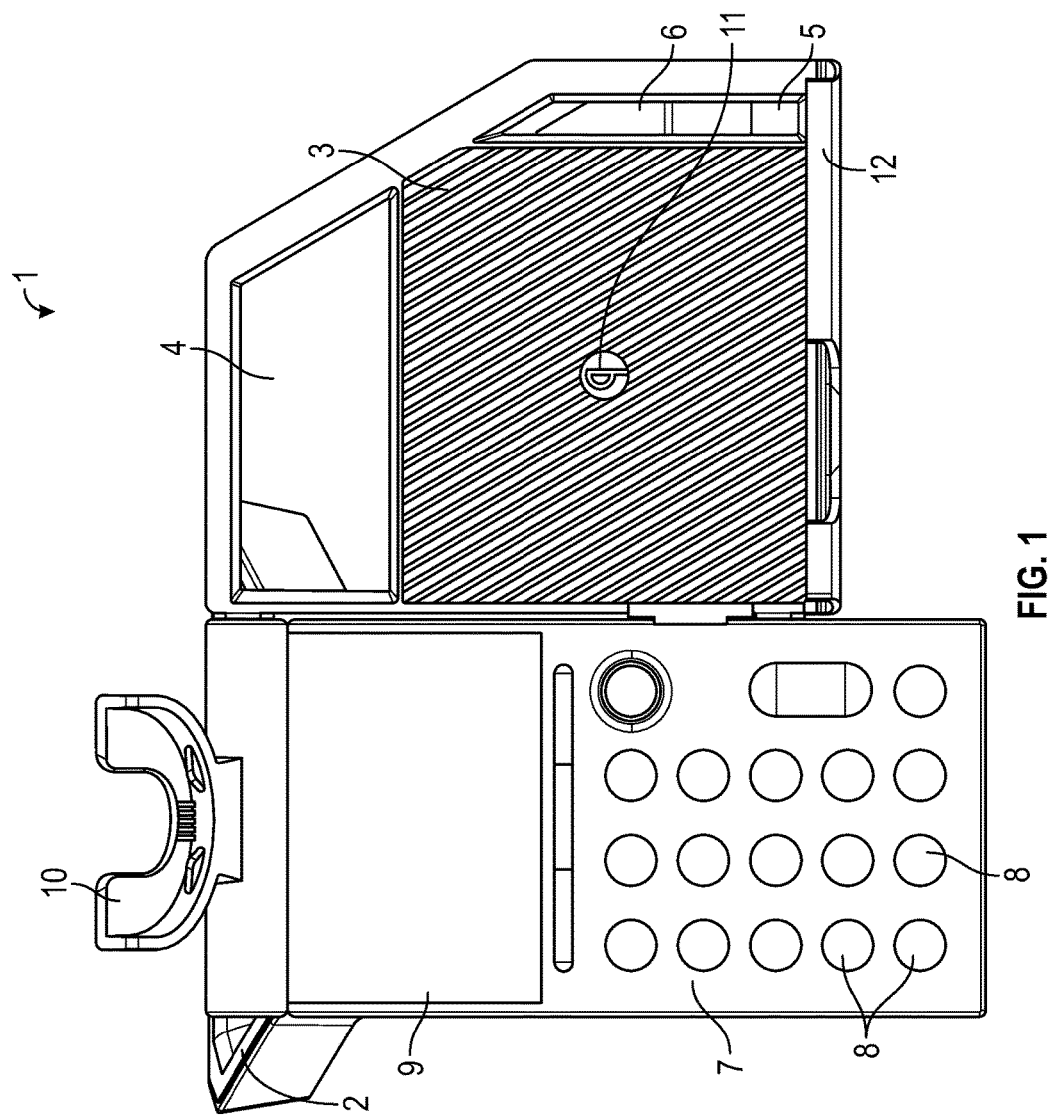
FIGS. 1 and 2 show a first embodiment of a holder for a mobile computing device.

Specific embodiments of the invention are described in detail herein. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the following explanation of the present invention according to the embodiments described, the terms "connected to" or "connected with" are used to indicate a mechanical connection between at least two components, devices, units, or modules.

Such a connection may be direct between the respective components, devices, units, or modules; or indirect, i.e., over intermediate components, devices, units, or modules.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the term "single", and other such terminology. Rather, the use of ordinal numbers is to distinguish between like-named elements. For example, a first element is distinct from a second element, and the first element may encompass more than one element and succeed (or precede) the second element in an ordering of elements.

In one aspect, a holder for a mobile computing device is provided. The holder comprises at least a base member, a device platform, and a support member. The base member comprises a plurality of spaced angular adjustment recesses. The device platform being pivotably connected to the base member and being configured for receiving a mobile computing device. The support member is pivotably connected with the device platform and configured for engagement with one of the angular adjustment recesses to allow for a plurality of different angular positions of the device platform with respect to the base member. The support member is spring-loaded to, upon movement of the device platform by a user, move from a first of the adjustment recesses to an adjacent adjustment recess.

The base member according to the present aspect may be of any suitable type. In some embodiments, the base member comprises multiple feet for allowing the holder to be placed on a horizontal surface. In some embodiments, the feet are made of a non-slip material, such as silicone rubber, to further increase the stability of the holder.

As discussed in the preceding, the base member comprises at least a plurality of spaced angular adjustment recesses. These recesses allow to adjust an angle between base member and the device platform, as will be discussed in more detail in the following. The recesses may be of any suitable type to engage with the support member, so that if the support member is engaged with a respective one of the recesses, the angle between the base member and the device platform is defined. In some embodiment, the two parts are latched with each other when the support member is engaged with one of the recesses.

The number of angular adjustment recesses is not limited. The base member may comprise any number of adjustment recesses greater than one in corresponding embodiments. Generally, the number of adjustment recesses provided may depend on the desired "granularity" of the discrete angular adjustment capability of the holder.

The device platform according to the present aspect is pivotably connected to the base member. In some embodiments, the device platform is connected with the base member over one or more suitable hinges. In some embodiments, the one or more hinges are arranged at an end of the device platform.

The device platform is further configured to receive a mobile computing device. In this context, the term "configured to receive" is understood to comprise any setup of the device platform that allows to at least partly mechanically support the mobile computing device once received, either directly or indirectly, such as for example through a protective case used with a smart phone. In some embodiments, the device platform is configured to latch with the mobile computing device. For example, the device platform may comprise one or more brackets to firmly latch to the mobile computing device. In an alternative or additional example, the device platform may comprise one or more of a magnet or an adhesive pad to latch to the mobile computing device. In some embodiments, the device platform is configured to support the mobile computing device, but not to latch with it. These embodiments may result in a rather "loose" connection between device and device platform, which however, may be sufficient or beneficial depending on the application.

It is noted, that the term "mobile computing device" is understood to comprise any mobile device comprising a processing unit, such as a microprocessor or microcontroller. Accordingly, the term "mobile computing device" comprises mobile phones, smart phones, tablets (tablet computers), laptops (laptop or notebook computers), smart wear, PDAs, music players, video players, HUDs (human interface devices), etc.

As discussed in the preceding, the mobile computing device holder further comprises the support member, which is pivotably connected with the device platform, and, as mentioned, configured to engage with (any) one of the angular adjustment recesses at a given time to allow a plurality of angular positions.

The support member may be of any suitable type to keep the device platform safely in the set angular position versus the base member, at least when typical forces of a user operating her or his mobile computing device are applied, e.g., when actuating controls (physical buttons or touch-sensitive controls) of the user interface of the mobile computing device.

The holder in further embodiments certainly may comprise additional components. For example, the holder in one exemplary embodiment may comprise one or more of a power supply, a phone handset, a microphone, a camera, a dial pad, a display screen, a touchscreen, a communication interface, a wireless communications interface, a central processing unit, one or more housings, and one or more batteries.

In some embodiments, the support member is connected with the device platform over a suitable hinge. In some embodiments, the hinge is arranged at an end of the support member. In some embodiments, the hinge is arranged substantially centered along a longitudinal axis of the device platform.

As discussed in the preceding and according to the present aspect, the support member is spring-loaded to move from a first of the adjustment recesses to a second of the adjustment recesses, which may be a neighboring recess, upon movement of the device platform by the user. The support member may in some embodiments comprise a corresponding spring, such as for example a compression spring, tension spring, torsion spring, coil spring, cantilever spring, gas spring, or any other device adapted to store and subsequently release mechanical energy.

As will be apparent from the preceding, the support member moves from the first adjustment recess to the second adjustment recess upon movement of the device platform by the user. This will consequently change the angle or angular position of the device platform with respect to the base member. In some embodiments, the angle or angular position of the longitudinal axis of the device platform with respect to the longitudinal axis of the base member is changed. Some embodiments allow single-handed adjustment of the angle of the device platform.

In view that the mobile device platform of the present aspect should be stable to allow operating the mobile computing device, but also to allow a convenient adjustment, various embodiments are conceivable.

As discussed in the preceding, the support member may be of any suitable type to keep the device platform safely in the set angular position versus the base member, at least when typical forces of a user operating her or his mobile computing device (such as approx. 5 N) are applied.

In some additional or alternative embodiments, a latch is arranged that holds the support member safely in the selected adjustment recess. In these embodiments, a latch release allows the user to disengage the latch and move the support member to another angular adjustment recess.

In some additional or alternative embodiments, the support member is spring-loaded towards an increased angle between the device platform and the base member. In the present embodiment, stability is provided for applying pressure on the device platform, e.g., by the user pressing a button on the mobile computing device, while it is easily possible to increase the angle between base member and device platform.

For decreasing the angle between the device platform and the base member and in some further additional or alternative embodiments, the support member may comprise an adjustment lever. The adjustment lever may be of any suitable type to allow angular adjustment of the device platform, e.g., by allowing the user to slightly "retract" the spring-loaded support member and then move to a lower angular position. In some embodiments, the adjustment lever is configured to allow single-handed lowering of the device platform.

In some embodiments, the adjustment lever is ergonomically curved. In some embodiments, the adjustment lever comprises a first lever element and a second lever element, arranged with their longitudinal axes at an angle of approximately 170 degrees to each other. In some embodiments, the device platform comprises a cut-out for the adjustment lever to allow a user to easily notice and/or operate the adjustment lever through the cut out. In some embodiments, the support member defines a support member plane and the adjustment lever extends from the support member in the support member plane.

In some embodiments, the base member comprises at least one guide surface to guide the support member when moving from the first of the adjustment recesses to the adjacent adjustment recess. The guide surface correspondingly facilitates angular adjustment of the device platform further and may be formed in any suitable way to allow moving the support member from the first adjustment recess to the next adjustment recess. In some embodiments, the guide surface comprises low-friction material to provide a particularly easy movement. In some embodiments, the guide surface is provided to guide the support member between all angular adjustment recesses.

In some embodiments, the base member comprises at least one stop to limit angular movement of the device platform. For example, the stop may be formed so that during use, the angle between the longitudinal axis of the device platform and the horizontal plane stays below 90 degrees.

In some embodiments, the support member comprises a substantially U-shaped or T-shaped bar. The present embodiments provide a lightweight but rigid setup. In some additional embodiments, the open ends of the U-shaped bar are connected to the device platform via hinges. In some embodiments, the bar is made of metal, plastic, or other rigid material.

In some embodiments, the support member comprises an elongated engagement bar and the adjustment recesses are correspondingly elongated. In these embodiments, the engagement bar is configured to engage with the elongated adjustment recesses. This setup increases the stability of the holder further. In some embodiments, the longitudinal axes of the elongated recesses are oriented parallel to each other. In some embodiments, the U-shaped or T-shaped bar of the support member comprises the elongated engagement bar, arranged at an end of the U-shaped or T-shaped bar, opposite to the open end(s). In some embodiments, the elongated engagement bar comprises one or more rollers to facilitate movement of the support member and thus the device platform.

In some embodiments, the adjustment recesses are arranged so that at least some of the plurality of different angular positions are evenly spaced. In this context, the term "evenly spaced" is understood as that the respective adjustment recesses allow a "stepped" increase or decrease in angle between the device platform and the support member, where the "steps" provide the same angular difference. For example, a first of the adjustment recesses may provide an angle between the device platform and the support member of 30 degrees, a second may provide an angle of 40 degrees, and a third may provide an angle of 50 degrees. The "step size" in this example obviously is 10 degrees.

In some embodiments, the device platform is L-shaped. For example, the device platform may have a protruding arm to hold the mobile computing device in place.

In some embodiments, the base member and the device platform are connected to pivot around first axis and the support member and the device platform are connected to pivot around second axis, wherein the first axis and the second axis are substantially parallel to each other. In some additional embodiments, the two axes are spaced from each other.

In some embodiments, the holder is configured for charging the mobile computing device. The holder for example may comprise an opening to allow a charging cable to be connected to the mobile computing device when the device is received at the device platform.

In some embodiments, the holder comprises a charger for the mobile device, i.e., an integrated charging apparatus. For example, the holder may comprise a power supply to provide charging power to the mobile computing device using a typical mains connection of using a USB connection. In some additional embodiments, the device platform comprises a charger for wireless charging of the mobile device. For example, the device platform may comprise an inductive or resonant charger pursuant to one or more of the the Qi, PMA, A4WP, and Rezence protocols.

In some embodiments, the holder comprises a communications unit to connect with the mobile computing device over a wire-based or wireless connection. For example, the holder may be configured for communication with the mobile device via Bluetooth. In additional or alternative embodiments, the holder comprises one or more of a speakerphone, a phone handset, a headset interface unit, a telephone interface unit (VOIP or POTS), a camera module, and a user interface. In the aforementioned embodiments, the holder may be configured to connect with the mobile computing device and provide accessory functions, such as controlling the device, conducting calls, dialing, etc. In some embodiments, the holder serves as an accessory device to the mobile computing device. In other alternative or additional embodiments, the holder provides functionality, even when not connected to a mobile computing device. For example, the telephone interface unit may be configured to allow VOIP (voice over IP) calls or POTS calls even without a mobile computing device being connected.

In some embodiments, the holder comprises a safety device, such as a so-called Kensington lock functionality.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

Figure 2:
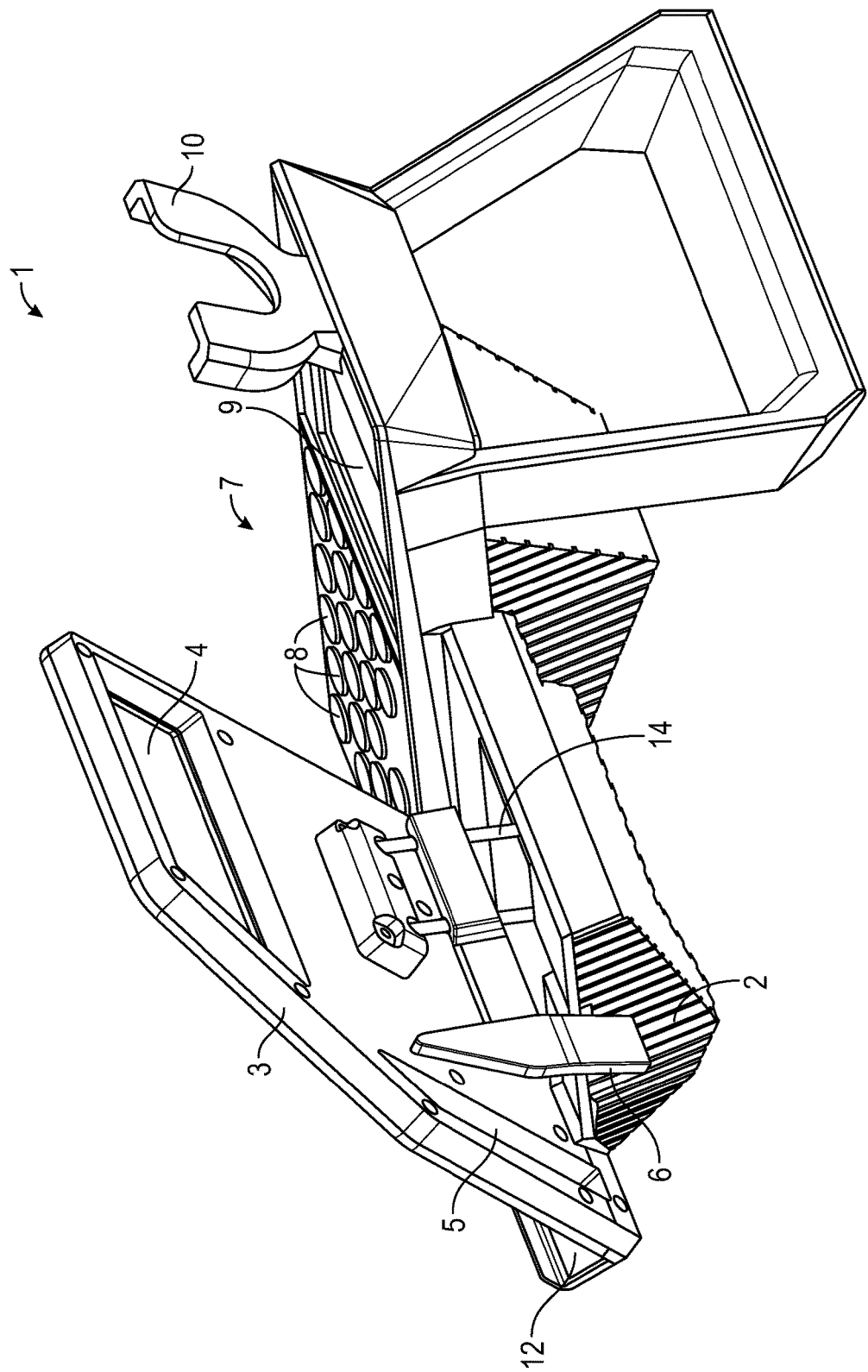

FIGS. 1 and 2 show a first embodiment of a holder for a mobile computing device 1, in the following referred to as "holder 1". FIG. 1 shows a front elevation of holder 1, while FIG. 2 shows a rear/side perspective view of it. Holder 1 comprises a base or base member 2 and a device platform 3 for accommodating a mobile (computing) device (not shown), such as a smart phone or tablet computer. Base member 2 and device platform 3 are pivotably connected using hinges 13a, 13b (see FIG. 3). The device platform 3 in this embodiment has an irregular shape with cut-outs 4, 5. Cut-out 4 allows for an improved antenna reception of the mobile device when on the device platform 3. Cut-out 5 allows to see an adjustment lever 6, which is configured to adjust the angular position, i.e., incline, of platform 3. The device platform 3 further comprises a wireless charging module 11 according to the Qi protocol to charge the mobile device when received on device platform 3. Device platform 3 further comprises a protruding arm 12, which acts like a stop to keep the mobile device safely on the device platform 3.

Base member 2 in the present embodiment serves as a stand of the holder 1. The base member 2 further comprises a user interface 7, having various controls 8 and a display 9. User interface 7 allows to control various functions of the mobile device and thus, to interact with it. A Bluetooth interface (not shown) is arranged as part of base member 2 to connect the user interface 7 with the mobile computing device. Base member 2 furthermore comprises a speakerphone module, a headset interface unit, and a handset interface unit (all not shown) so as to provide the user with convenient interfacing options when the mobile device is used with holder 1. A hook 10 is provided to receive a phone handset (not shown).

The device platform 3 can be brought into multiple angular positions with respect to the base 2 and the horizontal surface on which the holder 1 is placed in order to facilitate operation of the mobile device when on the device platform 3 and in particular, to improve the ability for a user to conduct video calls using a camera, integrated with the mobile device.

As will become apparent from FIG. 2, the holder 1 further comprises a support member 14, which results in a deck chair-like setup. Support member 14 keeps the device platform 3 in its angular position, but also allows to adjust the angle of the device platform 3.

Figure 3:
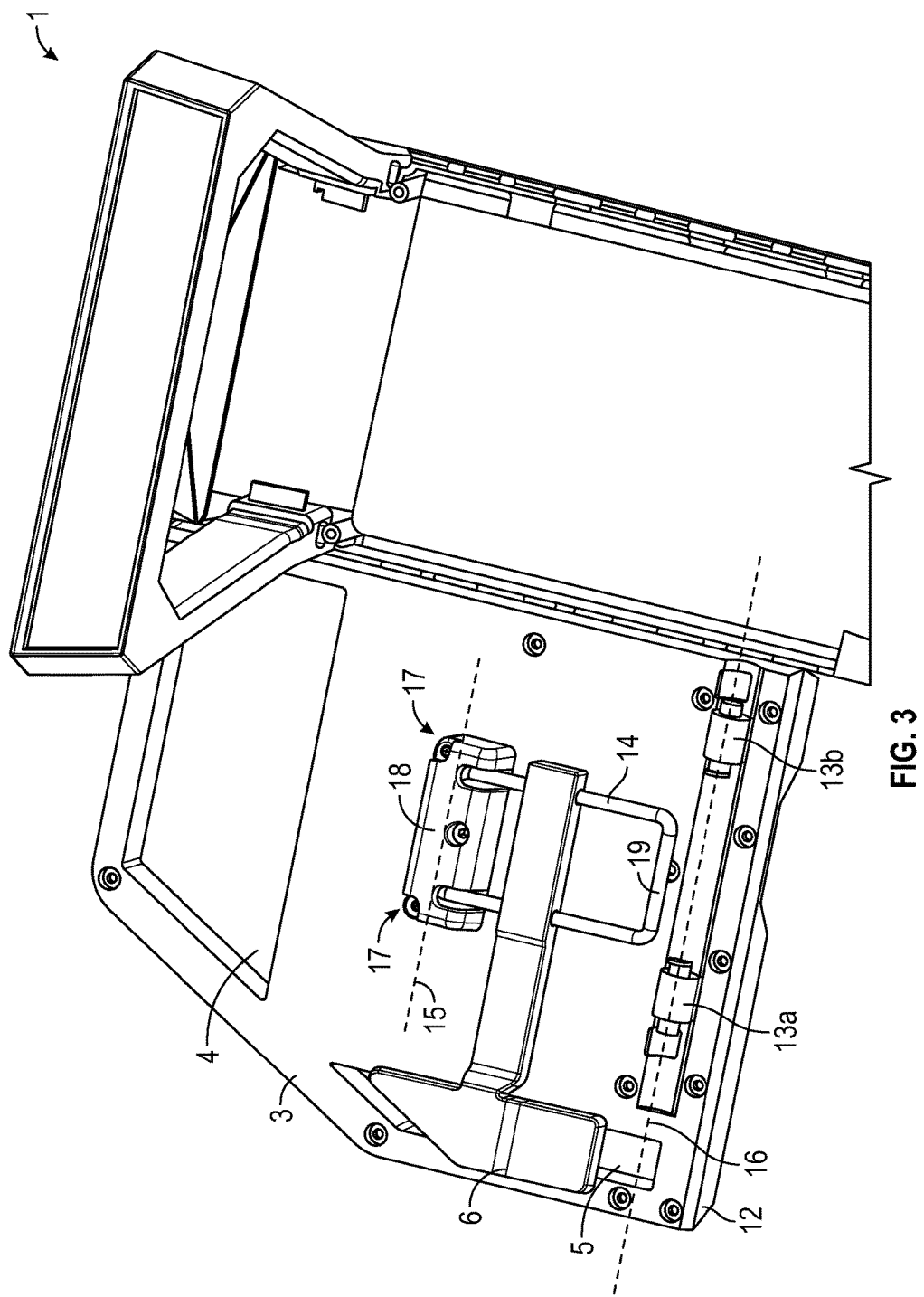
FIG. 3 shows a perspective view of the device platform underside of the holder according to the embodiment of FIGS. 1 and 2.

FIG. 3 shows a perspective view of the device platform 3 underside of holder 1 according to the embodiment of FIGS. 1 and 2. As can be seen, support member 14 comprises a U-shaped steel bar, connected with the device platform 3. Adjustment lever 6 is affixed to the U-shaped bar. The U-shaped bar comprises an engagement bar 19, which is configured to engage with one of discrete adjustment recesses 20a-20d (see FIG. 5) of base 2, as will be discussed in the following in more detail.

Figure 4:
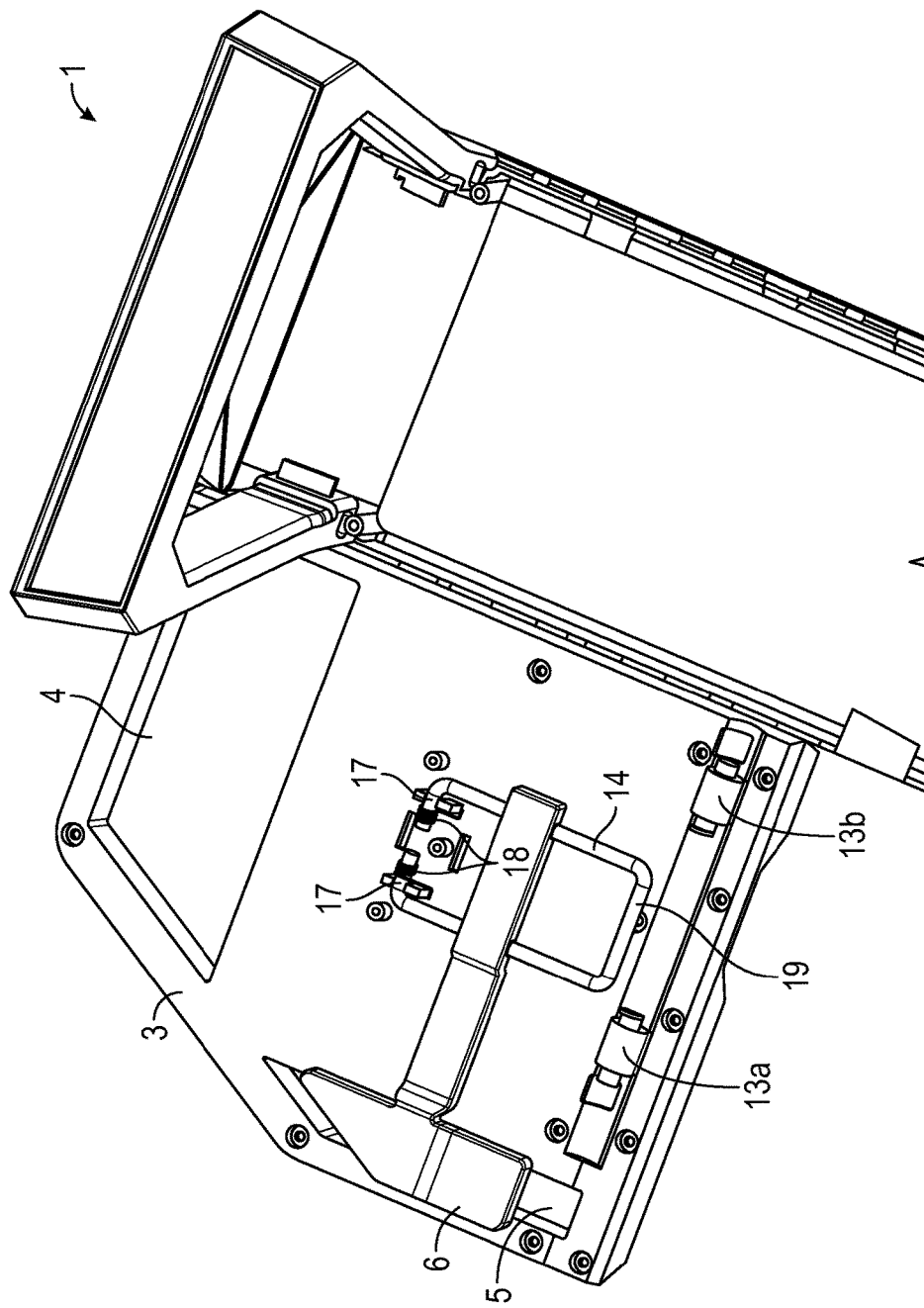
FIG. 4 shows a perspective view of the holder according to FIG. 3 with a hinge cover removed.

The two free ends of the U-shaped bar of support member 14 are pivotably connected with the device platform 3. In FIG. 3, reference numeral 15 indicates the axis of rotation of the U-shaped bar of support member 14 with reference to the device platform 3, while reference numeral 16 indicates the axis of rotation of the device platform 3 with reference to the base 2. The hinges 17 of support member 14 are covered by a hinge cover 18. FIG. 4 shows a perspective view of holder 1 according to FIG. 3 with the hinge cover 18 removed.

In addition to the hinges 17, FIG. 4 shows two torsion springs 18, which provide a force to support member 14 towards an increased angle between device platform 3 and base member 2, i.e., a force on support member 14 oriented outwardly from the device platform 3 in FIG. 4. The two springs 18 allow one-handed adjustment of the angle of the device platform 3 towards an increased angle, as will be discussed in more detail in the following.

Figure 5:
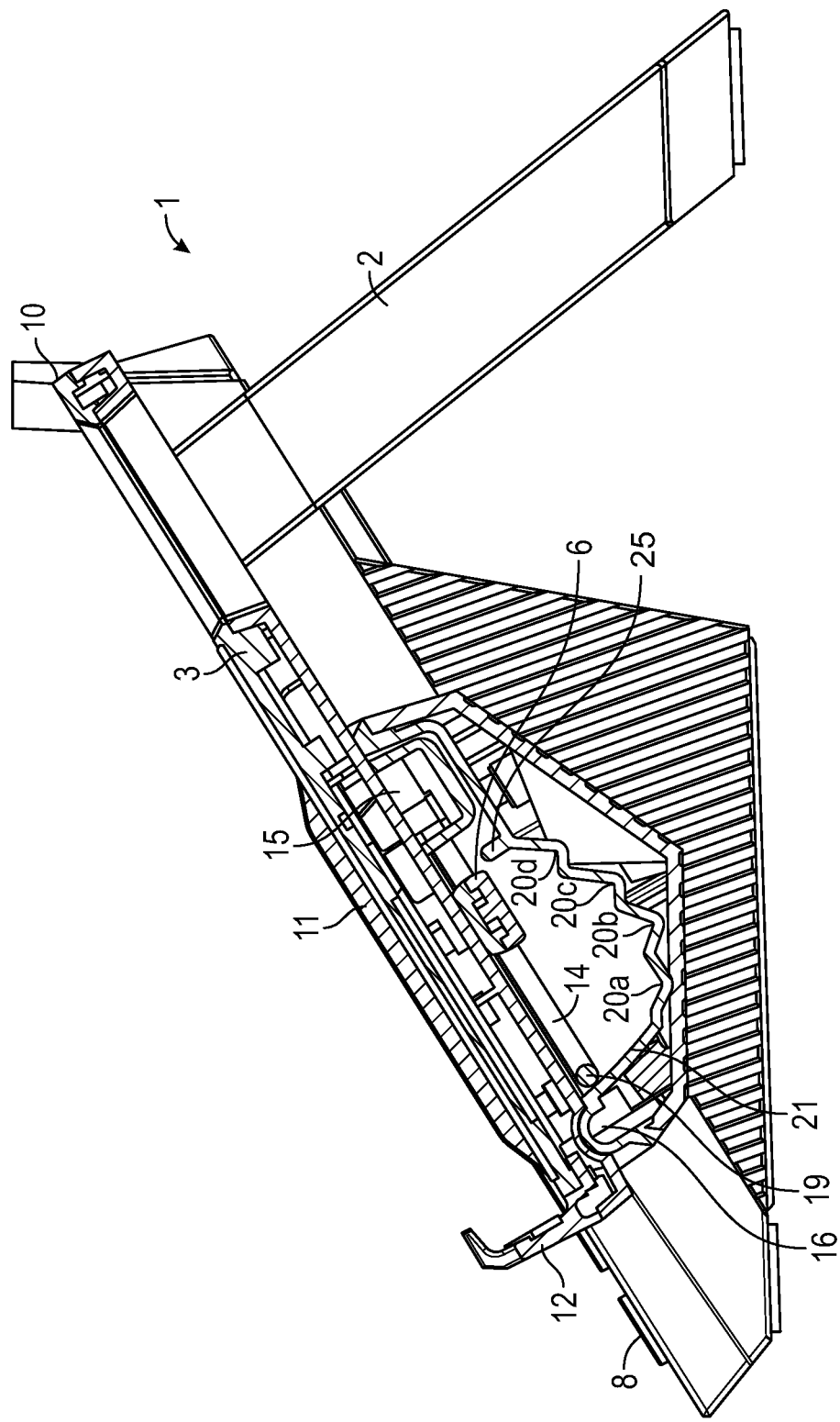
FIG. 5 shows a side elevation view of the holder of FIGS. 1 and 2.

As discussed in the preceding, engagement bar 19 is configured to engage with one of discrete adjustment recesses 20a-20d of base member 2. FIG. 5 shows a side elevation view of holder 1, showing a part cross-section through base 2 and device platform 3 to illustrate the functionality of the angle adjustment mechanism.

As can be seen from FIG. 5, base member 2 comprises a rather large cut-out for allowing support member 14 to move and to thus provide the ability to adjust the angle of device platform 3. The cut-out of base member 2 comprises four angular adjustment recesses 20a, 20b, 20c, 20d. The recesses 20a-20d are provided as a part of a guide track or surface 21 on which engagement bar 19 moves. A stop 25 limits the movement of engagement bar 19 on the guide track 21.

FIG. 5 shows the support member 14 in its fully retracted position, in which the longitudinal axis of support member 14 is parallel to the longitudinal axis of device platform 3. Due to the inclined arrangement of the upper side of base member 2, the device platform 3 in this position is arranged at an angle of 30 degrees to the bottom side of base member 3 and thus the horizontal surface on which the holder 1 is placed during use. The adjustment recesses 20a-20d each add another 10 degrees of incline to the device platform 3 when the engagement bar 19 is in the respective recess 20a-20d. Accordingly, the angle of device platform 3 is 40 degrees when the engagement bar 19 latches into recess 20a, 50 degrees when the engagement bar 19 latches into recess 20b, 60 degrees when the engagement bar 19 latches into recess 20c, and 70 degrees when the engagement bar 19 latches into recess 20d.

When the device platform 3 is pulled up by the user, the engagement bar 19 of support member 14 moves on the guide surface 21 due to the force of torsion springs 18. The engagement bar 19 latches in the first adjustment recess 20a. Once latched, a downward movement of engagement bar 19, i.e., towards a smaller device platform 3 angle, is not possible due to the design of the recesses at least when typical forces are applied during use. Moving the device platform 3 to a smaller angle requires the user to pull on the adjustment lever 6 towards the device platform 3, which recedes the engagement bar 19 out of contact with the recess 20a and thus allows downward movement. It is noted that moving the device platform 3 to a higher angle as well as moving the device platform 3 to a lower angle using the adjustment lever 6 only requires a single-handed operation.

Figure 6:
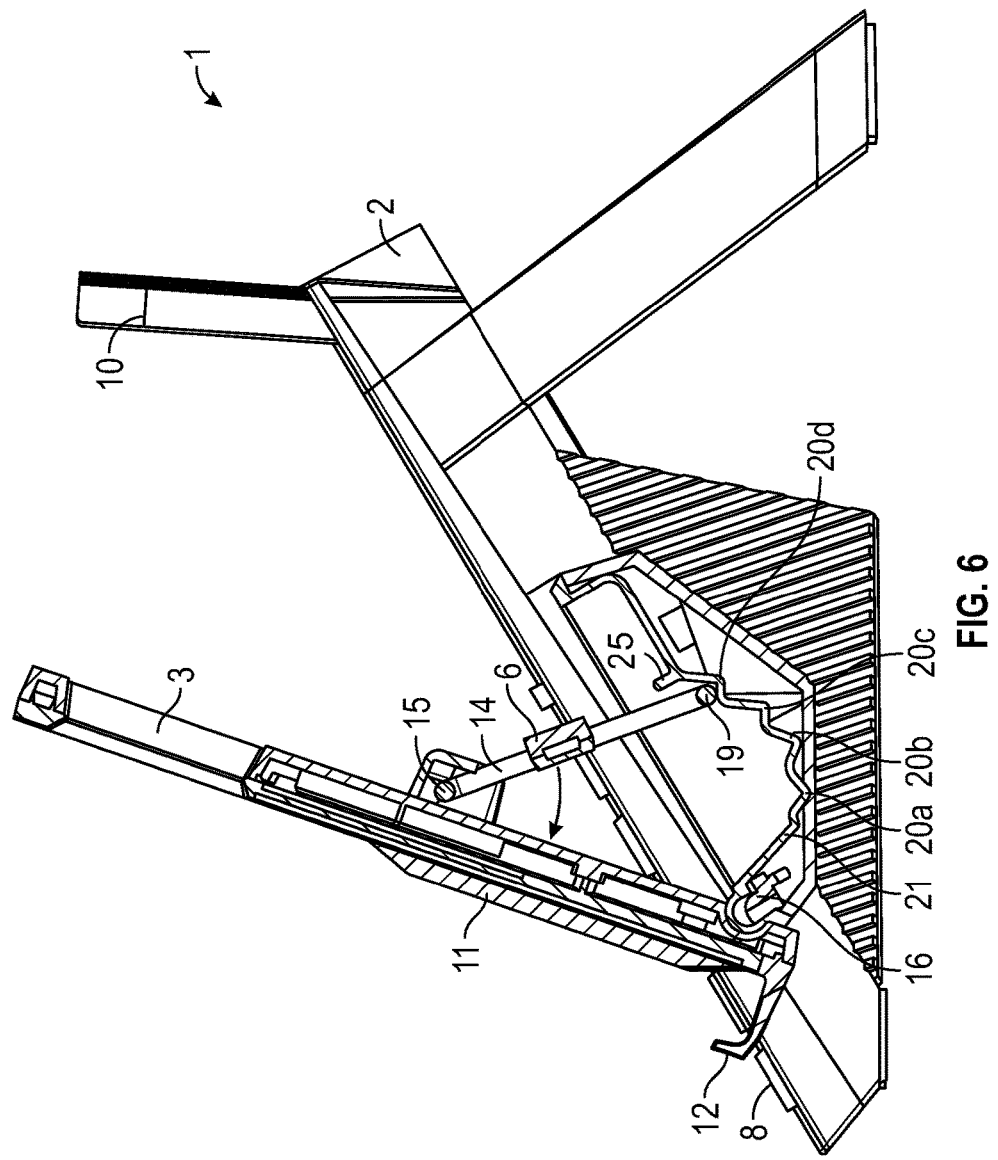
FIG. 6 shows another side elevation view of the holder corresponding to the view of FIG. 5.

FIG. 6 shows a side elevation view of holder 1 corresponding to the view of FIG. 5, but with the engagement bar 19 latched into recess 20d, resulting in an angle of 70 degrees of device platform 3. The stop 25 prohibits a further increase in angle to avoid a device on device platform 3 from falling over. FIG. 6 also illustrates how pulling the adjustment lever 6 inwardly, i.e., in the direction of the arrow, retracts the support member 14 and allows downward movement of the device platform 3.

Figure 7:
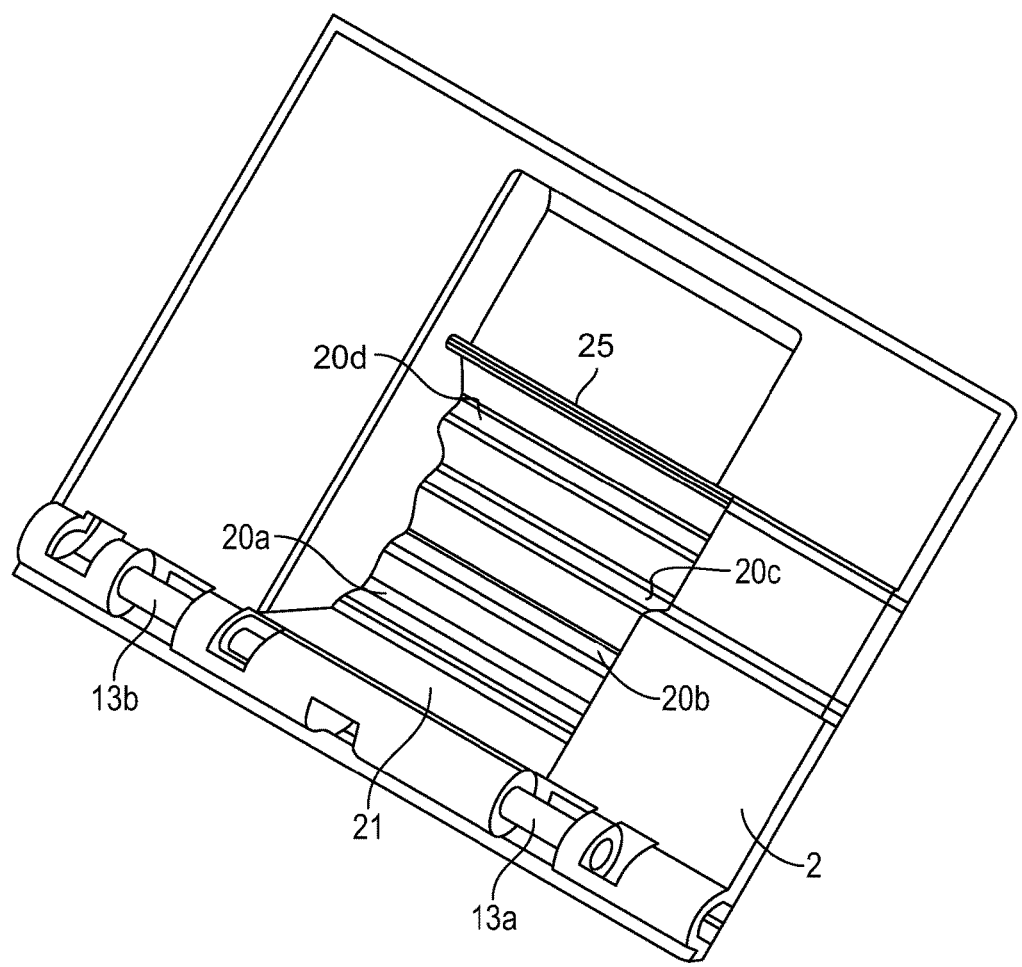
FIG. 7 shows a perspective view of a guide surface of the holder of FIGS. 1 and 2.

FIG. 7 shows a perspective view of the guide surface 21 with recesses 20a-20d. As will be apparent from the FIG., the recesses 20a-20d are formed as elongated notches having a length of approximately 4 mm. The elongated form of the recesses 20a-20d provide stability, even with high angles of device platform 3.

Figure 8:
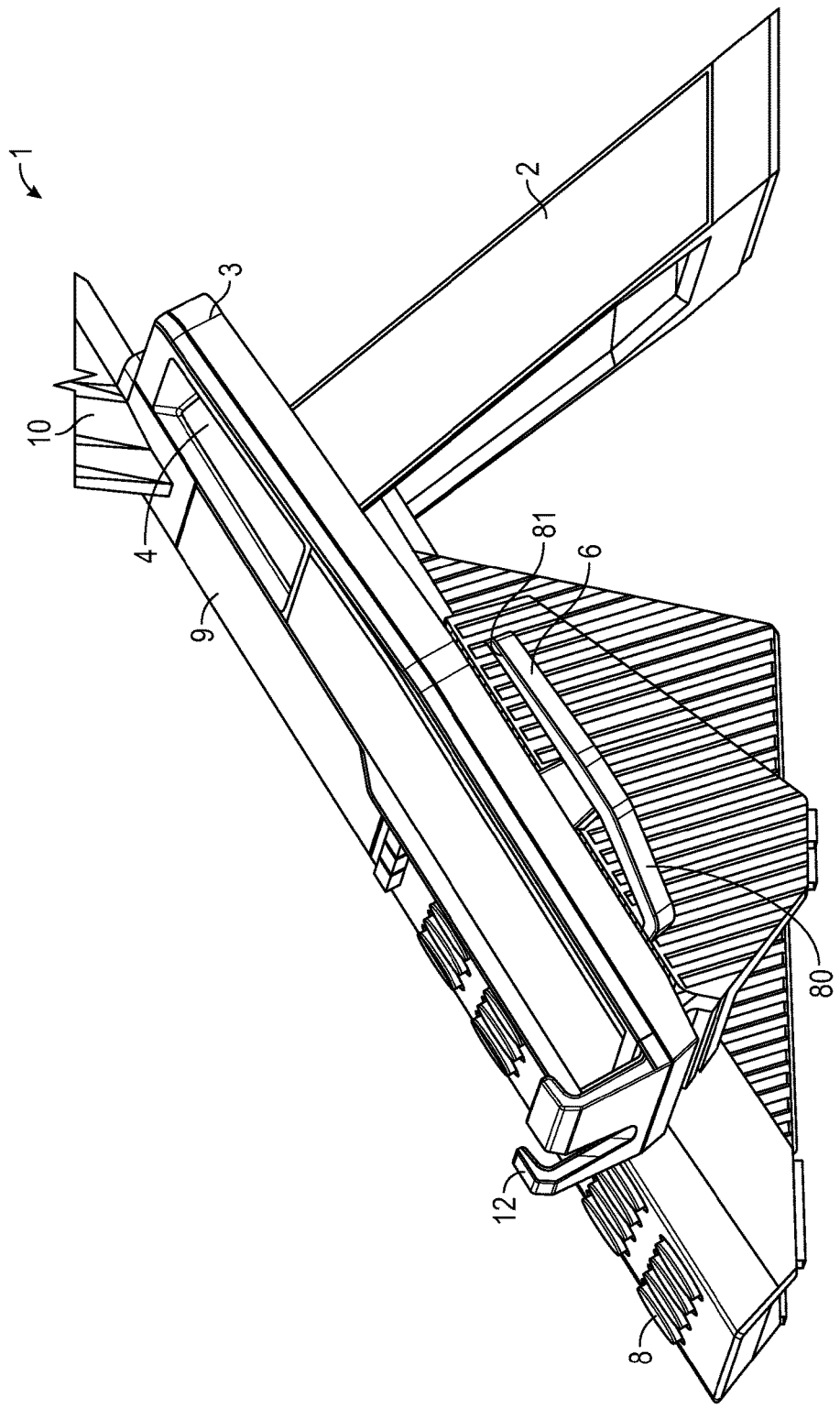
FIG. 8 shows a side frontal view of the holder according to the embodiment of FIGS. 1 and 2.

FIG. 8 shows a side frontal view of holder 1 according to the embodiment of FIG. 1.

As can be seen from the FIG., adjustment lever 6 has a curved, ergonomic shape. The angle between lower section 80 and upper section 81 is approx. 10 degrees.

Figure 9:
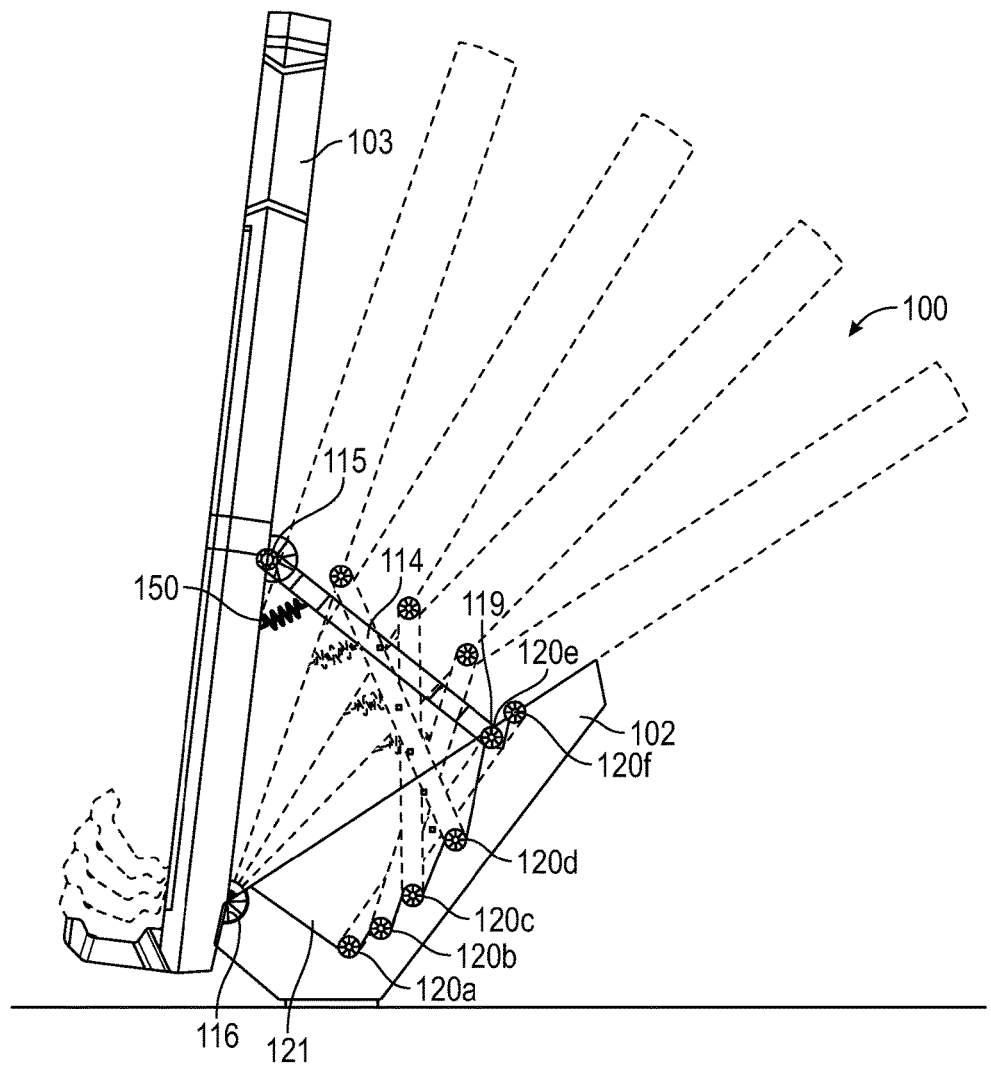
FIG. 9 shows a further embodiment of a holder, comprising a device platform and a base.

FIG. 9 shows a further embodiment of a holder 100, comprising a device platform 103 and a base 102. It is noted that the embodiment of FIG. 9 corresponds to the embodiment of FIGS. 1-8 with the following exceptions. Accordingly, reference numerals "1xx" designate corresponding parts of FIGS. 1-8, i.e., the reference numerals "1xx" correspond to reference numerals "xx" of FIGS. 1-8.

The embodiment of FIG. 9 provides a more compact base 102 compared with base 2 of the preceding FIGS. Furthermore, the embodiment of FIG. 9 provides six adjustment recesses 120a-120f, i.e., an increased angular "granularity". Instead of torsion springs 18, the embodiment of FIG. 9 comprises a compression spring 150 between device platform 103 and support member 114. The multiple angular positions of device platform 103 and the resulting positions of support member 114, engagement bar 119 and axis 115 are indicated in FIG. 9 by dotted lines.

While the invention has been illustrated and described in detail in the drawings and foregoing description, such illustration and description are to be considered illustrative or exemplary and not restrictive; the invention is not limited to the disclosed embodiments. For example, it is possible to operate the invention in any of the preceding embodiments, wherein instead of a U-shaped bar of support member 14, a T-shaped bar is used; and/or instead of the device platform 3 having a wireless charging module 11, the device platform 3 comprising a cable-based charging module.

The invention has been described in the preceding with reference to various embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims or different embodiments does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A holder for a mobile computing device, comprising
a base member with a plurality of spaced angular adjustment recesses;
a device platform, the device platform being pivotably connected to the base member and being configured for receiving a mobile computing device; and
a support member, pivotably connected with the device platform and configured for engagement with one of the angular adjustment recesses to allow a plurality of different angular positions of the device platform with respect to the base member; wherein
the support member is spring-loaded to, upon movement of the device platform by a user, move from a first of the adjustment recesses to an adjacent adjustment recess.

2. The holder for a mobile computing device of claim 1, wherein the base member comprises at least one guide surface to guide the support member when moving from the first of the adjustment recesses to the adjacent adjustment recess.

3. The holder for a mobile computing device of claim 2, wherein the guide surface is provided to guide the support member when moving between any of the angular adjustment recesses.

4. The holder for a mobile computing device of claim 1, the holder being configured for a one-handed angular adjustment by the user.

5. The holder for a mobile computing device of claim 1, wherein the base member comprises at least one stop to limit angular movement of the device platform.

6. The holder for a mobile computing device of claim 1, wherein the support member is spring-loaded towards an increased angle between the device platform and the base member.

7. The holder for a mobile computing device of claim 1, wherein the support member has an adjustment lever for decreasing an angle between device platform and base member.

8. The holder for a mobile computing device of claim 7, wherein the adjustment lever is ergonomically curved.

9. The holder for a mobile computing device of claim 7, wherein the device platform comprises a cut-out for the adjustment lever.

10. The holder for a mobile computing device of claim 1, wherein the support member comprises a U-shaped bar.

11. The holder for a mobile computing device of claim 1, wherein the support member comprises a T-shaped bar.

12. The holder for a mobile computing device of claim 1, wherein the support member comprises an elongated engagement bar, configured to engage with elongated adjustment recesses of the base member.

13. The holder for a mobile computing device of claim 1, wherein the adjustment recesses are arranged so that at least some of the plurality of different angular positions are evenly spaced.

14. The holder for a mobile computing device of claim 1, wherein the device platform is L-shaped.

15. The holder for a mobile computing device of claim 1, wherein the base member and device platform are connected to pivot around first axis and the support member and the device platform are connected to pivot around second axis, wherein the first axis and the second axis are substantially parallel to each other.

16. The holder for a mobile computing device of claim 15, wherein the two axes are spaced from each other.

17. The holder for a mobile computing device of claim 1, wherein the holder is configured for charging the mobile computing device.

18. The holder for a mobile computing device of claim 1, further comprising a charger for the mobile computing device.

19. The holder for a mobile computing device of claim 1, wherein the device platform comprises a charger for wireless charging of the mobile computing device.

20. The holder for a mobile computing device of claim 1, further comprising one or more of a speakerphone, a headset interface unit, a telephone interface unit, a user interface.

* * * * *